United States Patent
Bhadury et al.

(10) Patent No.: US 11,238,068 B2
(45) Date of Patent: Feb. 1, 2022

(54) GENERATING A MODEL ASSOCIATING TOPICS WITH CONTENT ITEMS BASED ON CHARACTERISTICS OF DIGITAL MAGAZINES INCLUDING A SET OF CONTENT ITEMS AND WORDS IN CONTENT ITEMS OF THE SET

(71) Applicant: Flipboard, Inc., Palo Alto, CA (US)

(72) Inventors: Arnab Bhadury, Vancouver (CA); Vlad Ionut Cora, North Vancouver (CA); Dusan Jovanovic, Brooklyn, NY (US); Martin Jack Rose, Coquitlam (CA)

(73) Assignee: Flipboard, Inc., Palo Alto, CA (US)

( * ) Notice: Subject to any disclaimer, the term of this patent is extended or adjusted under 35 U.S.C. 154(b) by 408 days.

(21) Appl. No.: 16/207,107

(22) Filed: Dec. 1, 2018

(65) Prior Publication Data

US 2020/0175039 A1    Jun. 4, 2020

(51) Int. Cl.
*G06F 16/28* (2019.01)
*G06F 16/9535* (2019.01)
*G06F 16/35* (2019.01)
*H04L 29/08* (2006.01)
*G06N 7/00* (2006.01)

(52) U.S. Cl.
CPC ......... *G06F 16/285* (2019.01); *G06F 16/355* (2019.01); *G06F 16/9535* (2019.01); *G06N 7/005* (2013.01); *H04L 67/10* (2013.01)

(58) Field of Classification Search
None
See application file for complete search history.

(56) References Cited

U.S. PATENT DOCUMENTS

| 10,387,574 | B1 * | 8/2019 | Anders | G06F 40/30 |
| 2011/0258229 | A1 * | 10/2011 | Ni | G06F 16/35 707/776 |
| 2017/0228463 | A1 * | 8/2017 | Sharma | G06F 16/2477 |

* cited by examiner

*Primary Examiner* — Giuseppi Giuliani
(74) *Attorney, Agent, or Firm* — Fenwick & West LLP

(57) ABSTRACT

A digital magazine server generates a model to associate topics with content items. To generate the model, the digital magazine server selects a set of content items that have been included in one or more digital magazines. For each content item of the set, the digital magazine server determines a distribution of concepts associated with a content item of the set based on characteristics of digital magazines including the content item of the set and a distribution of topics associated with the content item of the set based on words included in the content item. Additionally, the digital magazine server determines a parameter defining a relationship between the distributions of concepts and the distributions of topics associated with content items of the set. A model based on the distributions of concepts and of topics as well as the parameter is generated and stored for application to content items.

24 Claims, 5 Drawing Sheets

GENERATING A MODEL ASSOCIATING TOPICS WITH CONTENT ITEMS BASED ON CHARACTERISTICS OF DIGITAL MAGAZINES INCLUDING A SET OF CONTENT ITEMS AND WORDS IN CONTENT ITEMS OF THE SET

BACKGROUND

This invention relates generally to selecting content for inclusion in a digital magazine and more specifically to determining topics associated with content items received by a digital magazine server.

An increasing amount of content is provided to users through digital distribution channels. While this allows users to more easily access a range of content, the increasing amount of content often makes it difficult for a user to identify content most likely to be of interest to the user. Various techniques to recommend content to users are based on the user's interactions with content items presented by an online system, such as a website or a social networking system. However, the large volume of content items maintained by various online systems makes it challenging for online systems to identify content items to analyze for recommendation to a user and to recommend content items to the user.

Online systems presenting content items to users often correlate topics with content items and subsequently use those topics to present content items to various users. For example, based on topics correlated with content items previously presented to a user, an online system subsequently presents to the user other content items correlated with one or more matching topics. However, when an online system obtains a significant number of content items with which a diverse array of topics may be unevenly correlated (e.g., certain topics are correlated with large numbers of content items, while fewer topics are correlated with relatively small numbers of content items), conventional methods for correlating topics with content items are more concerned with discriminating between topics rather than identifying relationships between topics. Additionally, many conventional techniques for correlating topics with content items are computationally intensive.

SUMMARY

A digital magazine server receives content items from various sources or information identifying content items maintained by various sources. Users of the digital magazine server provide the digital magazine server with information identifying various digital magazines. Each digital magazine maintained by the digital magazine server includes one or more content items identified by a user or the digital magazine server. The digital magazine server determines a relative layout of content items included in the digital magazine based on characteristics of the content items and page templates maintained by the digital magazine server.

Additionally, the digital magazine server maintains various characteristics of the digital magazines. In various embodiments, the digital magazine server stores an identifier of a digital magazine in association with identifiers of content items included in the digital magazine, along with a title and a description of the digital magazine. The title and the description of the digital magazine are received from a user who provided the digital magazine server with information identifying the digital magazine. To simplify inclusion of content items in digital magazines, the digital magazine server associates topics with content items, allowing users to more easily identify content items for inclusion in digital magazines associated with particular topics. In various embodiments, the digital magazine server analyzes characteristics of content items and associates topics with the content items based on those characteristics.

To train a model to associate topics with content items based on characteristics of the content items, the digital magazine server selects a set of content items that were previously included in at least one digital magazine maintained by the digital magazine server. In various embodiments, the set includes content items that have been included in at least a threshold number of digital magazines. However, in other embodiments, the set includes content items that have been included in at least one digital magazine and that have any suitable characteristic or combination of characteristics.

For each content item of the set, the digital magazine server identifies characteristics of each digital magazine in which the content item is included. In various embodiments, the digital magazine server identifies a title and a description associated with the content item of the set. For example, the digital magazine server retrieves an identifier of the content item and determines an identifier of each digital magazine including the content item. Using the identifiers of the digital magazines including the content item, the digital magazine server identifies characteristics of each digital magazine including the content item. For example, the digital magazine server identifies a title and a description of each digital magazine including the content item.

From the characteristics of each digital magazine including a content item of the set, the digital magazine server determines one or more labels associated with each content item of the set. For example, the digital magazine server determines labels of a content item of the set as noun phrases extracted from titles of digital magazines including the content item. As another example, the digital magazine server determines labels of a content item of the set as noun phrases extracted from a description of the digital magazine including the content item. Hence, the digital magazine server determines one or more labels for each content item of the set based on characteristics (e.g., titles, descriptions) of digital magazines including the content item. The digital magazine server stores the labels in association with the content items of the set for which the labels were determined.

Based on a number of times different labels are associated with various content items, the digital magazine server determines a concept distribution. In various embodiments, the concept distribution is a distribution identifying probabilities of different concepts being associated with content items based on labels determined from characteristics of digital magazines including the content items. For example, the concept distribution is a Dirichlet distribution determined from a concept prior, which specifies an initial estimation of a mixture of concepts associated with content items, and numbers of times different concepts are identified from characteristics of digital magazines. Each concept includes one or more topics. Additionally, the digital magazine server determines a topic distribution based on a number of occurrences of different words or phrases in content items maintained by or accessible to the digital magazine server. In various embodiments, the topic distribution is a Dirichlet distribution determined from a topic prior, which specifies an initial estimation of a mixture of topics associated with concepts, and frequencies with which different words or phrases are identified from content items maintained by or accessible to the digital magazine server. The topic prior differs from the concept prior in various embodiments.

For each content item of the set that was included in at least one digital magazine, the digital magazine server determines a distribution of concepts associated with the content item based on the labels associated with the content item and the number of times the labels were associated with the content item. In various embodiments, labels associated with a content item of the set are based on words or phrases extracted from titles and descriptions of digital magazines including the content item. For example, the distribution of concepts associated with a content item of the set is a categorical distribution based on a number of labels associated with the content item and numbers of times different labels were associated with the content item. Hence, the distribution of concepts associated with the content item represents probabilities of different concepts being associated with the content item based on numbers of times different labels were associated with the content item.

From the distribution of concepts associated with each content item of the set, the digital magazine server determines a parameter defining a relationship between the distribution of concepts associated with the content item and a distribution of topics associated with the content item. The parameter is based on a number of labels associated with the content item of the set. Additionally, for each content item of the set, the digital magazine server determines a distribution of topics associated with the content item based on words included in the content item. In various embodiments, the digital magazine server applies a bag-of-words model to a content item of the set to determine frequencies with which different words are included in the content item, while weighting words by the inverse of their frequency within the content item, and determines topics associated with the content item as the words based on the frequencies with which different words are included in the content item. In various embodiments, the distribution of topics associated with a content item of the set is a categorical distribution based on a number of occurrences of different words or phrases in the content item. Hence, the distribution of topics associated with the content item represents probabilities of different topics being associated with the content item based on the frequencies with which different words or phrases occur in the content item.

From the distributions of concepts associated with the content items of the set, the distributions of topics associated with the content items of the set, and the parameters defining relationships between the distributions of concepts and the distributions of topics, the digital magazine server generates a model applying topics to content items based on characteristics of the content items of the set. In various embodiments, the digital magazine server modifies the distributions of concepts associated with content items of the set by removing concepts having less than a threshold position in the distributions of concepts. Similarly, the digital magazine server modifies the distributions of topics associated with content items of the set by removing topics having less than a threshold position in the distributions of topics. Using the modified distributions of concepts associated with content items of the set and the modified distributions of concepts associated with topics of the set, the digital magazine server determines modified distributions of concepts associated with each content item of the set based on the labels associated with the content items of the set, a modified parameter defining the relationship between the distributions of concepts associated with the content items of the set and the modified distributions of topics associated with content items of the set, and modified distributions of topics associated with content items of the set based on words included in the content items of the set. Subsequently, the digital magazine server iteratively modifies the distribution of the concepts associated with content items of the set and the distribution of the topics associated with content items of the set and modifies the parameter defining the relationship between the distributions of concepts associated with the content items of the set and the modified distributions of topics associated with content items of the set until one or more criteria are satisfied to generate the model. For example, the digital magazine server modifies the distribution of the concepts associated with content items of the set and the distribution of the topics associated with content items of the set and modifies the parameter defining the relationship between the distributions of concepts associated with the content items of the set and the modified distributions of topics associated with content items of the set until a negative log-probability of the model based at least in part on the parameter decreases at a threshold rate or does not decrease. Based on the iterative modification, the digital magazine server generates a value based on the modifications to the parameters defining relationships between the distributions of concepts associated with the content items of the set and the distributions of topics associated with the content items of the set. In other embodiments, the digital magazine server generates the model by generating a distribution of concepts associated with content items from the distributions of the content items and generating a distribution of topics associated with content items from the distributions of topics associated with the content items of the set. The digital magazine server generates the model as a combination of the value based on the modifications to the parameters, the distribution of concepts associated with content items, and the distribution of topics associated with content items. Application of the model to content items generates topics associated with the content items from words of the content items and also generates probabilities of the generated topics being associated with the content items.

This generation of the model allows the digital magazine server to learn dependencies of topics on concepts as well as correlations between combinations of topics and concepts. For example, mapping labels associated with content items to concepts allows the digital magazine server to determine correlations between labels. Additionally, generating the model from separate distributions of topics and distributions of concepts more efficiently uses computational resources than alternative methods for generating the model. Further, determination of labels based on titles and descriptions of digital magazines including content items allows model generation to be language agnostic rather than using different language-specific word vectors to identify the labels.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. For example, based on selections made by the user and/or on behalf of the user, the digital server application generates a digital magazine with one or more sections including content items retrieved from a number of sources and personalized for the user. A digital magazine application executing on a computing device (such as a mobile communication device, tablet, computer, or any other suitable computing system) retrieves the generated digital magazine and presents it to the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
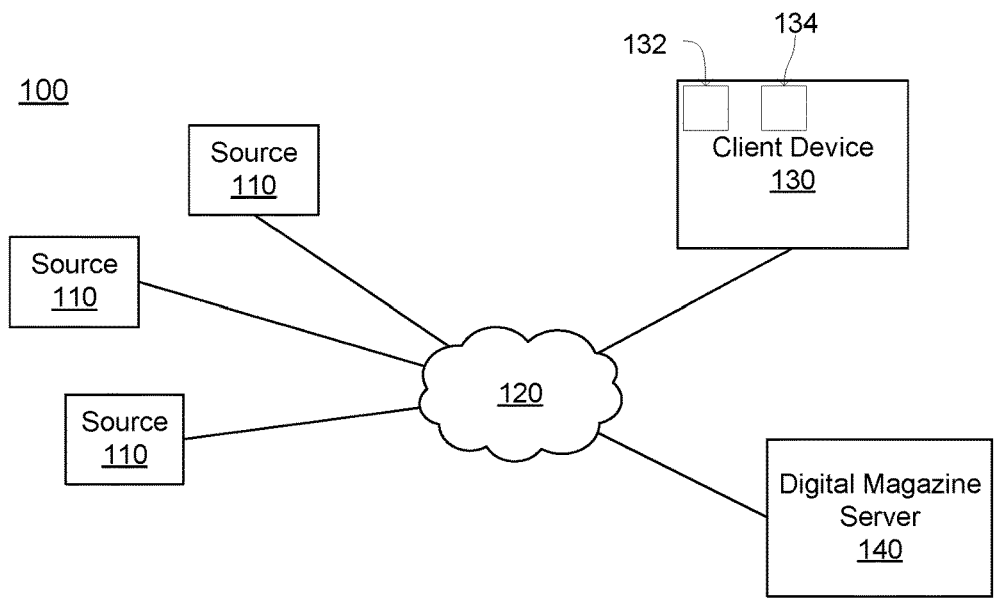
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine servers 140.

A source 110 is a computing system capable of providing various types of content to a client device 130. Examples of content provided by a source 110 include text, images, video or audio on web pages, web feeds, social networking information, messages, and other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." An article or a content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML), extensible markup language (XML), or JavaScript Object Notation (JSON). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or laptop computer. Alternatively, the client device 130 may be a device having computer functionality, such as a personal digital assistant (PDA), a mobile telephone, a smartphone, or another suitable device. In one embodiment, the client device 130 executes an application allowing a user of the client device 130 to interact with the digital magazine server 140. For example, the client device 130 executes an application that communicates instructions or requests for content items to the digital magazine server 140 and presents the content to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 130, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 130 have display devices 132 with different display areas, different resolutions, or differences in other characteristics.

One or more input devices 134 included in the client device 130 receive input from the user. The client device 130 may include different input devices 134. In one embodiment, the client device 130 includes a touch-sensitive display for receiving input data, commands, or information from a user. In other embodiments, the client device 130 includes a keyboard, a trackpad, a mouse, or any other device capable of receiving input from a user. Additionally, in some embodiments, the client device may include multiple input devices 134. Inputs received via the input device 134 may be processed by a digital magazine application associated with the digital magazine server 140 and executing on the client device 130 to allow a client device user to interact with content items presented by the digital magazine server 140.

The digital magazine server 140 retrieves content items from one or more sources 110, generates pages in a digital magazine by processing the retrieved content, and provides the pages to the client device 130. As further described below in conjunction with FIG. 2, the digital magazine server 140 generates one or more pages for presentation to a user based on content items retrieved from one or more sources 110 and information describing organization and presentation of content items. For example, the digital magazine server 140 determines a page layout positioning content items relative to each other based on information associated with a user and generates a page including the content items positioned according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to that of a print magazine, the digital magazine server 140 allows a user to interact with content items from multiple sources 110 via the client device 130 more easily than when scrolling horizontally or vertically to access various content items.

Figure 2:
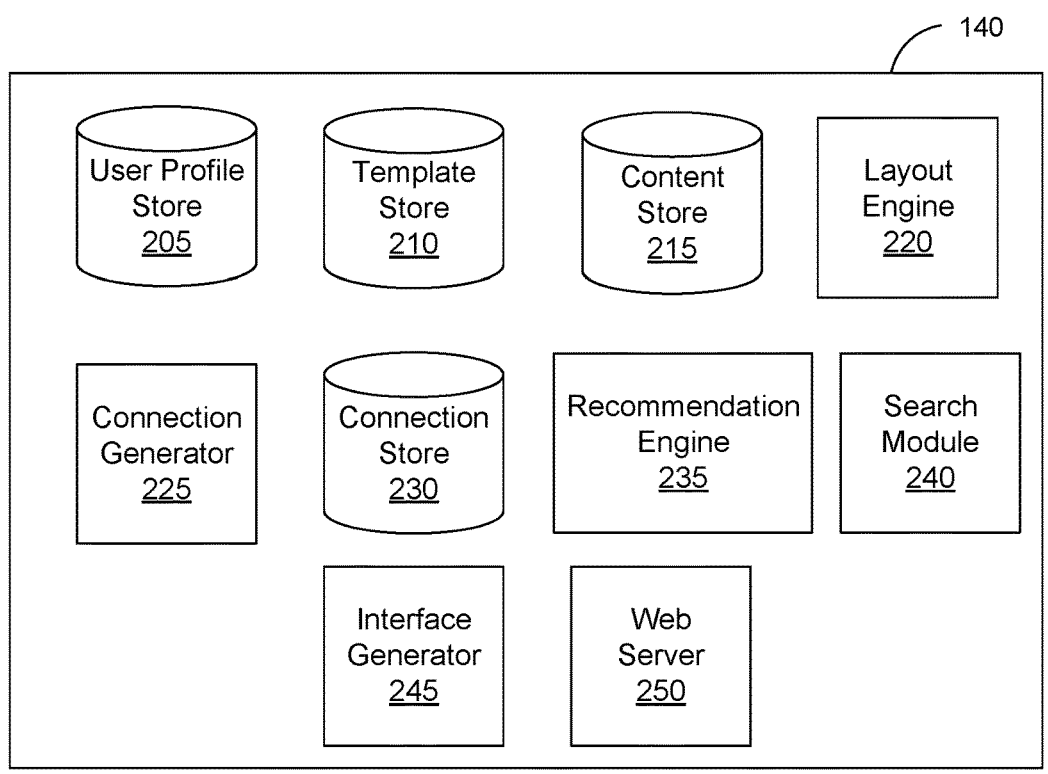
FIG. 2 is a block diagram of an architecture of the digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding digital magazine server user. Examples of information stored in a user profile include biographic, demographic, and other types of descriptive information, such as hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, user profiles may also be associated with entities such as businesses or organizations. This allows an entity to provide or access content items via the digital magazine server 140. An entity may post information about itself or its products, or provide other content items associated with the entity to users of the digital magazine server 140. For example, users of the digital magazine server 140 may receive a digital magazine or section including content items provided by an entity via the digital magazine server 140.

The template store 210 includes page templates each describing a spatial arrangement ("layout") of content items relative to each other on a page for presentation to a user by a client device 130. A page template includes one or more slots, each configured to present one or more content items. In some embodiments, slots in a page template may be configured to present a particular type of content item or a content item having one or more specified characteristics. For example, a slot in a page template is configured to present an image while another slot in the page template is configured to present text. Each slot has a size (e.g., small, medium, or large) and an aspect ratio. One or more page templates may be associated with types of client devices 130, allowing content items to be presented in different locations and at different sizes when the content items are viewed on different client devices 130. Additionally, page templates may be associated with sources 110, allowing a source 110 to specify the format of pages presenting content items retrieved from the source 110. For example, a page template associated with an online retailer allows the online retailer to present content items via the digital magazine server 140 with a specific organization. Examples of page templates are further described in U.S. patent application Ser. No. 13/187,840, filed on Jul. 21, 2011, and U.S. patent application Ser. No. 13/938,227, filed on Jul. 9, 2013, each of which is hereby incorporated by reference in its entirety.

The content store 215 stores objects that each represent various types of content. For example, the content store 215 stores content items received from one or more sources 110 within a threshold time interval. Examples of content items stored by the content store 215 include a page post, a status update, an image, a photograph, a video, a link, an article, video data, audio data, a check-in event at a location, or any other type of content. A user may specify a section including content items having a common characteristic, in which case the common characteristic is stored in the content store 215 along with an association with the user profile or the user specifying the section.

The layout engine 220 retrieves content items from one or more sources 110 or from the content store 215 and generates a layout including the content items based on a page template from the template store 210. Based on the retrieved content items, the layout engine 220 may identify candidate page templates from the template store 210 and score the candidate page templates based on characteristics of the slots in different candidate page templates and based on characteristics of the content items. Based on the scores associated with candidate page templates, the layout engine 220 selects a page template and associates the retrieved content items with one or more slots to generate a layout where the retrieved content items are positioned relative to each other and sized based on their associated slots. When associating a content item with a slot, the layout engine 220 may associate the content item with a slot configured to present a specific type of content item or content items having one or more specified characteristics. Examples of using a page template to present content items are further described in U.S. patent application Ser. No. 13/187,840, filed on Jul. 21, 2011, U.S. patent application Ser. No. 13/938,223, filed on Jul. 9, 2013, and U.S. patent application Ser. No. 13/938,226, filed on Jul. 9, 2013, each of which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing a user's interactions with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with the interactions. The connection generator 225 generates a connection between a user and a content item if the user's interactions with the content item satisfy one or more criteria. In one embodiment, the connection generator 225 determines one or more weights specifying a strength of the connection between the user and the content item based on the user's interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to the user. In one embodiment, weights associated with connections between a user and content items are used to determine weights associated with various implicit connections between the content items. User content graphs for multiple users of the digital magazine server 140 are combined to generate a global content graph identifying connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or multiple user content graphs and stores the adjacency matrix in the connection store 230. The adjacency matrix describes connections between content items. For example, the adjacency matrix includes identifiers of content items and weights representing the strength or closeness of connections between content items. As an example, the weights indicate a degree of similarity in subject matter or other characteristics associated with various content items. In other embodiments, the connection store 230 includes various adjacency matrices determined from various user content graphs; the adjacency matrices may be analyzed to generate an overall adjacency matrix for content items retrieved by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a user and an additional user by analyzing the user's interactions with content items posted by the additional user, whether presented using the digital magazine server 140 or another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile, connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be of interest to a digital magazine server user. For example, content items having an implicit connection of at least a threshold weight to a content item with which the user interacted are recommended to the user. As another example, the recommendation engine 235 presents a user with content items having one or more attributes in common with a content item with which an additional user having a threshold connection confidence score with the user interacted. Recommendations for additional content items may be presented to a user when the user views a content item using the digital magazine, as a notification to the user by the digital magazine server 140, or to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user from the user's user profile. Examples of attributes of content items include a type (e.g., image, story, link, video, audio, etc.), a source 110 from which a content item was retrieved, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or further analyzed based on user characteristics and on content item attributes to generate a more refined set of recommended content items. A setting included in a user's user profile may specify a length of time that content items are analyzed before identifying recommended content items to the user, allowing a user to balance refinement of recommended content items with time used to identify recommended content items.

As further described below in conjunction with FIGS. 4 and 6, in various embodiments the recommendation engine 235 generates a model that determines topics or concepts associated with content items based on words or phrases included in content items. In various embodiments, a concept is associated with one or more topics, allowing the recommendation engine 235 to maintain a hierarchy of concepts or topics as well as to determine relationships between concepts and topics. As described above, the recommendation engine 235 uses similarities between topics or concepts associated with content items presented to a user, or associated with content items with which the user interacted, to recommend other content items to the user. In various embodiments, the recommendation engine 235 identifies content items that have previously been included in one or more digital magazines and generates a model that determines topics or concepts associated with other content items based on words included in the other content items. As further described below in conjunction with FIGS. 4 and 6, the recommendation engine 235 identifies labels associated with content items previously included in one or more digital magazines based on characteristics of the digital magazines including the content items. For example, the recommendation engine 235 determines labels associated with content items based on words or phrases extracted from titles and descriptions of digital magazines including the content items. The recommendation engine 235 determines a distribution of concepts associated with content items included in digital magazines based on labels associated with the content items and determines a distribution of topics associated with the content items based on words or phrases included in the content items, as further described below in conjunction with FIGS. 4 and 6. Additionally, the recommendation engine 235 determines parameters defining a relationship between the distribution of topics and the distribution of concepts for different content items included in one or more digital magazines. From the parameters, distributions of topics, and distributions of concepts, the recommendation engine 235 generates and stores a model for application to words included in other content items to associate topics or concepts with the other content items, as further described below in conjunction with FIGS. 4 and 6.

The search module 240 receives a search query from a user and retrieves content items from one or more sources 110 based on the search query. For example, content items having at least a portion of an attribute matching at least a portion of the search query are retrieved from one or more sources 110. The user may specify sources 110 from which content items are retrieved through settings maintained by the user's user profile or by specifying one or more sources in the search query. In one embodiment, the search module 240 generates a section of the digital magazine including the content items identified based on the search query, as the identified content items have a common attribute of their association with the search query. Presenting identified content items from a search query in a section of the digital magazine allows a user to more easily identify additional content items at least partially matching the search query when additional content items are provided by sources 110.

To more efficiently identify content items based on search queries, the search module 240 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 240 may present identified content items based on a ranking. One or more factors associated with the content items may be used to generate the ranking. Examples of factors include global popularity of a content item among users of the digital magazine server 140, connections between users interacting with a content item and the user providing the search query, and information from a source 110. Additionally, the search module 240 may assign a weight to the index information associated with each content item based on similarity between index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 maintains instructions associating different gestures with navigation through content items or presented via a digital magazine. Instructions maintained by the interface generator 245 are communicated to a digital magazine application or other application executing on a client device 130 on which content from the digital magazine server 140 is presented. In various embodiments, the interface generator 245 communicates instructions to a client device 130 identifying topics or concepts associated with a content item and probabilities of the topics or concepts being associated with the content item; the generated interface also includes options for a user to whom the interface is presented to increase or decrease the probability of a topic or a concept being associated with the content item by interacting with an option included in the interface, as further described below in conjunction with FIG. 5.

The web server 250 links the digital magazine server 140 via the network 120 to the one or more client devices 130, as well as to the one or more sources 110. The web server 250 serves web pages, as well as other content, such as JAVA®, FLASH®, XML, and so forth. The web server 250 may retrieve content items from one or more sources 110. Additionally, the web server 250 communicates instructions for generating pages of content items from the layout engine 220 and instructions for processing received input from the interface generator 245 to a client device 130. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130 or by a combination of the digital magazine server 140 and a digital magazine application executing on a client device 130.

Page Templates

Figure 3:
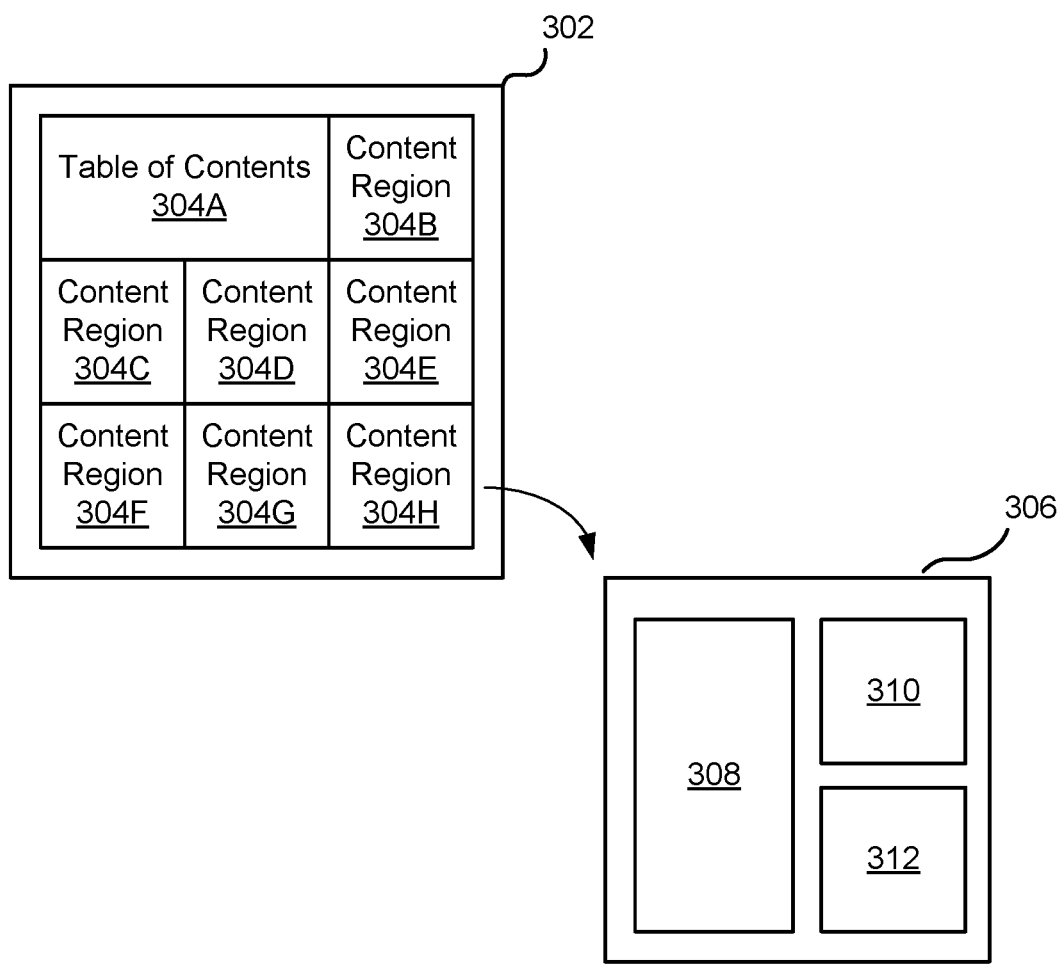
FIG. 3 is an example presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of a specific type of content item or content items having specific characteristics. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user of a client device 130, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 302 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such as the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are retrieved. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions 304. Information describing sections or subsections, such as a characteristic common to content items in a section or subsection, may be stored in the content store 215 and associated with a user profile to simplify generation of a section or subsection for the user. A page template 302 associated with a subsection may be identified, and slots in the page template 302 associated with the subsection may be used to determine the presentation of content items from the subsection relative to each other. Referring to FIG. 3, the content region 304H includes a content item associated with a newspaper to indicate a section including content items retrieved from the newspaper. When a user interacts with the content region 304, a page template 302 associated with the section is retrieved, as well as content items associated with the section. Based on the page template 302 associated with the section and the content items, the digital magazine server 140 generates a page presenting the content items based on the layout described by the slots of the page template 302. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Figure 4:
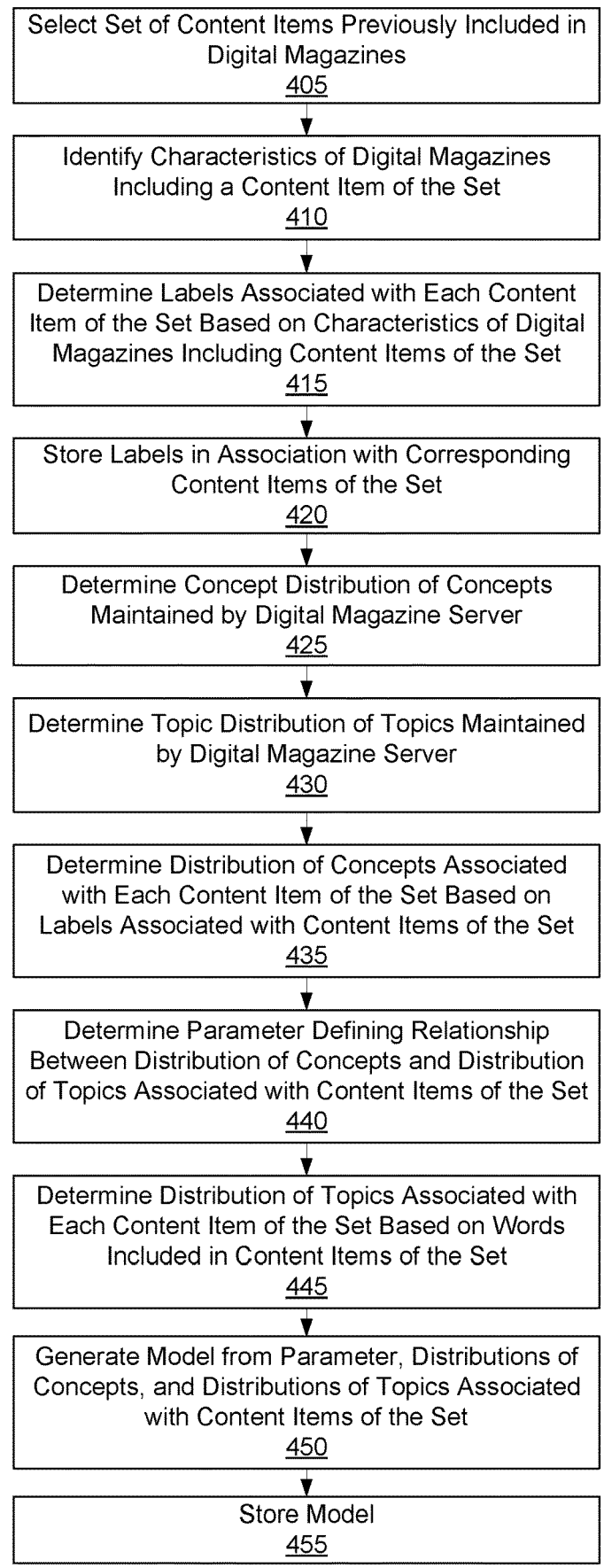
FIG. 4 is a flowchart of a method for generating a model determining topics associated with content items obtained by a digital magazine server, in accordance with an embodiment of the invention.

Determining Topics Associated with Content Items from Words in the Content Items FIG. 4 is a flowchart of one embodiment of a method for generating a model determining topics associated with content items obtained by a digital magazine server 140. In various embodiments, the method includes different or additional steps than those described in conjunction with FIG. 4. Additionally, the method may perform the steps described in different orders than the order shown in FIG. 4 in various embodiments.

The digital magazine server 140 retrieves content items from various sources 110 or information identifying content items maintained by various sources 110. Users of the digital magazine server 140 provide the digital magazine server 140 with information identifying various digital magazines. Each digital magazine maintained by the digital magazine server 140 includes one or more content items identified by a user or the digital magazine server 140. As further described above in conjunction with FIGS. 2 and 3, the digital magazine server 140 determines a relative layout of content items included in the digital magazine based on characteristics of content items included in the digital magazine and page templates 302 maintained by the digital magazine server 140, as further described above in conjunction with FIGS. 2 and 3.

The digital magazine server 140 maintains various characteristics of digital magazines maintained by or identified to the digital magazine server 140. In various embodiments, the digital magazine server 140 stores an identifier of a digital magazine in association with identifiers of content items included in the digital magazine, along with a title and a description of the digital magazine. The title and the description of the digital magazine are received from a user who provided the digital magazine server 140 with information identifying the digital magazine. To simplify inclusion of content items in digital magazines, the digital magazine server 140 associates topics with content items, allowing users to more easily identify content items for inclusion in digital magazines associated with particular topics. In various embodiments, the digital magazine server 140 analyzes characteristics of a content item and associates topics with the content items based on those characteristics.

To train a model to associate topics with content items based on characteristics of the content items, the digital magazine server 140 selects 405 a set of content items that were previously included in at least one digital magazine maintained by the digital magazine server 140. In various embodiments, the set includes content items that have been included in at least a threshold number of digital magazines. However, in other embodiments, the set includes content items that have been included in at least one digital magazine and that have any suitable characteristic or combination of characteristics.

For each content item of the set, the digital magazine server 140 identifies 410 characteristics of each digital magazine in which a content item of the set is included. In various embodiments, the digital magazine server 140 identifies 410 a title and a description associated with the content item of the set. For example, the digital magazine server 140 retrieves an identifier of the content item of the set and determines an identifier of each digital magazine including the content item. Using the identifiers of the digital magazines including the content item, the digital magazine server 140 obtains characteristics of each digital magazine. For example, the digital magazine server 140 identifies 410 a title and a description of each digital magazine including the content item of the set.

From the characteristics of each digital magazine including a content item of the set, the digital magazine server 140 determines 415 one or more labels associated with each content item of the set. For example, the digital magazine server 140 determines 415 labels of a content item of the set as noun phrases extracted from titles of digital magazines including the content item. As another example, the digital magazine server 140 determines 415 labels of a content item of the set as noun phrases extracted from a description or a title of the digital magazine including the content item.

Hence, the digital magazine server 140 determines 415 one or more labels for each content item of the set based on characteristics (e.g., titles, descriptions) of digital magazines including the content items. The digital magazine server 140 stores 420 the labels in association with the content items of the set for which the labels were determined. In various embodiments, the digital magazine server 140 stores 420 labels determined 415 for a content item of the set in association with an identifier of the content item of the set. The digital magazine server 140 stores 420 a number of times a label is associated with the content item of the set in association with the label and the content item; the number of times the label is associated with the content item of the set provides an indication of a frequency with which the label was identified from characteristics (e.g., titles, descriptions) of digital magazines including the content item. This allows the digital magazine server to store 420 labels associated with each content item of the set.

Additionally, the digital magazine server 140 determines 425 a concept distribution of concepts maintained by the digital magazine server 140, where each concept includes one or more topics. The digital magazine server 140 also determines 430 a topic distribution of topics maintained by the digital magazine server 140. The concept distribution is a Dirichlet distribution based on a concept prior and a number of concepts maintained by the digital magazine server 140, while the topic distribution is also a Dirichlet distribution based on a topic prior and a number of topics maintained by the digital magazine server 140. The concept prior affects a distribution of words or phrases per concept, while the topic prior affects a distribution of words or phrases per topic. In various embodiments, the concept prior and the topic prior are parameters stored by the digital magazine server 140 or specified by an administrator of the digital magazine server 140. The administrator may specify a concept prior where each concept includes a limited number of labels and may also specify a topic prior where each topic includes a limited number of terms from content items. The digital magazine server 140 concurrently determine 425 the concept distribution and determine 430 the topic distribution in various embodiments, or may determine 435 the concept distribution and determine 430 the topic distribution in any suitable order in various embodiments.

For each content item of the set, the digital magazine server 140 determines 435 a distribution of concepts associated with the content item based on the labels associated with the content item and the number of times the labels were associated with the content item. In various embodiments, the distribution of concepts associated with the content item of the set is a categorical distribution based on a number of labels associated with the content item and numbers of times different labels were associated with the content item. Hence, the distribution of concepts associated with the content item represents probabilities of different concepts being associated with the content item based on the number of times different labels were associated with the content item.

From the distribution of concepts associated with each content item of the set, the digital magazine server 140 determines 440 a parameter defining a relationship between the distribution of concepts associated with the content item and a distribution of topics associated with the content item based on a number of labels associated with the content item. In some embodiments, the parameter is based on a number of labels associated with the content item of the set. For example, the digital magazine server 140 determines 440 the parameter based on a normalized vector of numbers of different labels associated with the content item of the set; the digital magazine server 140 applies one or more factors to the normalized vector of numbers of different labels associated with the content item when determining 440 the parameter defining the relationship between the distribution of concepts associated with the content item and a distribution of topics associated with the content item.

Additionally, for each content item of the set, the digital magazine server 140 determines 445 a distribution of topics associated with the content item based on words included in the content item. In various embodiments, the digital magazine server 140 applies a bag-of-words model to the content item of the set to determine frequencies with which different words are included in the content item, while weighting words by the inverse of their frequency within the content item, and determines 445 the topics associated with the content item as the words based on the frequencies with which different words are included in the content item. For example, the digital magazine server 140 determines 445 topics associated with the content item of the set as words or phrases having at least a threshold frequency of occurrence within the content item. As another example, the digital magazine server 140 uses Compressed Gibbs Sampling to determine 445 topics associated with the content item from the words or phrases in the content item. However, in other embodiments, the digital magazine server 140 uses any suitable method or methods to determine 445 topics associated with the content item of the set based on words included in the content item. In various embodiments, the distribution of topics associated with the content item of the set is a categorical distribution based on a number of occurrences of different words or phrases in the content item. Hence, the distribution of topics associated with the content item of the set represents probabilities of different topics being associated with the content item based on the frequencies with which different words or phrases occur in the content item.

From the distributions of concepts associated with the content items of the set, the distributions of topics associated with the content items of the set, and the parameters defining relationships between the distributions of concepts and the distributions of topics, the digital magazine server 140 generates 450 a model applying topics to content items based on characteristics of content items of the set. Application of the model to content items generates topics associated with the content items from words of the content items and also generates probabilities of the generated topics being associated with the content items. In various embodiments, the digital magazine server 140 modifies the distributions of concepts associated with content items of the set by removing concepts having less than a threshold position in the distributions of concepts associated with content items. Similarly, the digital magazine server 140 modifies the distributions of topics associated with content items of the set by removing topics having less than a threshold position in the distributions of topics. Using the modified distributions of concepts associated with content items of the set and the modified distributions of concepts associated with topics of the set, the digital magazine server 140 determines 435 modified distributions of concepts associated with each content item of the set based on the labels associated with the content items of the set, determines 440 a modified parameter defining the relationship between the distributions of concepts associated with the content items of the set and the modified distributions of topics associated with content items of the set, and determines 445 modified distributions of topics associated with content items of the set based on words included in the content items of the set. Subsequently the digital magazine server 140 iteratively modifies the distribution of the concepts associated with content items of the set and the distribution of the topics associated with content items of the set and modifies the parameter defining the relationship between the distributions of concepts associated with the content items of the set and the modified distributions of topics associated with content items of the set until one or more criteria are satisfied to generate 450 the model. For example, the digital magazine server 140 modifies the distribution of the concepts associated with content items of the set and the distribution of the topics associated with content items of the set and modifies the parameter defining the relationship between the distributions of concepts associated with the content items of the set and the modified distributions of topics associated with content items of the set until a negative log-probability of the model based at least in part on the parameter decreases at a threshold rate or does not decrease. Based on the iterative modification, the digital magazine server 140 generates a value based on the modifications to the parameters defining relationships between the distributions of concepts associated with the content items of the set and the distributions of topics associated with the content items of the set. In one embodiment, the digital magazine server 140 generates 450 the model by generating a distribution of concepts associated with content items from the distributions of the content items and generating a distribution of topics associated with content items from the distributions of topics associated with the content items of the set. The digital magazine server 140 generates 450 the model by combining the distribution of concepts associated with content items, and the distribution of topics associated with content items based on a combination of the value based on the modifications to the parameters.

In various embodiments, the digital magazine server 140 receives input from users of the digital magazine server 140 when generating 450 the model. For example, the digital magazine server 140 selects a content item of the set and transmits an identifier of the content item as well as the distribution of concepts associated with the selected content item and the distribution of topics associated with the selected content item to a user of the digital magazine system 140. An interface including the identifier of the selected content item, and identifying at least a group of the concepts and probabilities of each concept of the group being associated with the selected content item (or identifying at least a group of the topics and probabilities of topic concept of the group being associated with the selected content item), is generated by the digital magazine server 140 for presentation to the user. The interface includes an option to increase a probability of an identified concept (or topic) being associated with the selected content item and an alternative option to decrease a probability of an identified concept (or topic) being associated with the selected content item. When the digital magazine server 140 receives a selection of the option or the alternative option included in the interface, the digital magazine server 140 modifies the distribution of concepts (or topics) associated with the selected content item accordingly. For a concept (or topic) where the user selects the option to increase the probability of the concept (or topic) being associated with the selected content item, the digital magazine server 140 modifies the distribution by increasing the probability of the concept (or topic) being associated with the selected content item. In some embodiments, the digital magazine server 140 increases the probability of a concept (or topic) being associated with the selected content item to a specific value (e.g., 1) in response to receiving a selection of the option to increase the probability of the concept (or topic). Conversely, for a concept (or topic) where the user selects the alternative option to decrease the probability of the concept (or topic) being associated with the selected content item, the digital magazine server 140 modifies the distribution by decreasing the probability of the concept (or topic) being associated with the selected content item. In some embodiments, the digital magazine server 140 decreases the probability of a concept (or topic) being associated with the selected content item to a particular value (e.g., 0) in response to receiving a selection of the option to decrease the probability of the concept (or topic).

In some embodiments, the digital magazine server 140 determines 435 the distribution of concepts associated with the content item, determines 440 the parameter defining the relationship between the distribution of concepts associated with the content item and a distribution of topics associated with the content item, determines 445 the distribution of topics associated with the content item, and generates 450 the model, as further described above, in parallel. In other embodiments, the digital magazine server 140 performs any suitable combination of determining 435 the distribution of concepts associated with the content item, determining 440 the parameter defining the relationship between the distribution of concepts associated with the content item and a distribution of topics associated with the content item, determining 445 the distribution of topics associated with the content item, and generating 450 the model in parallel.

Figure 5:
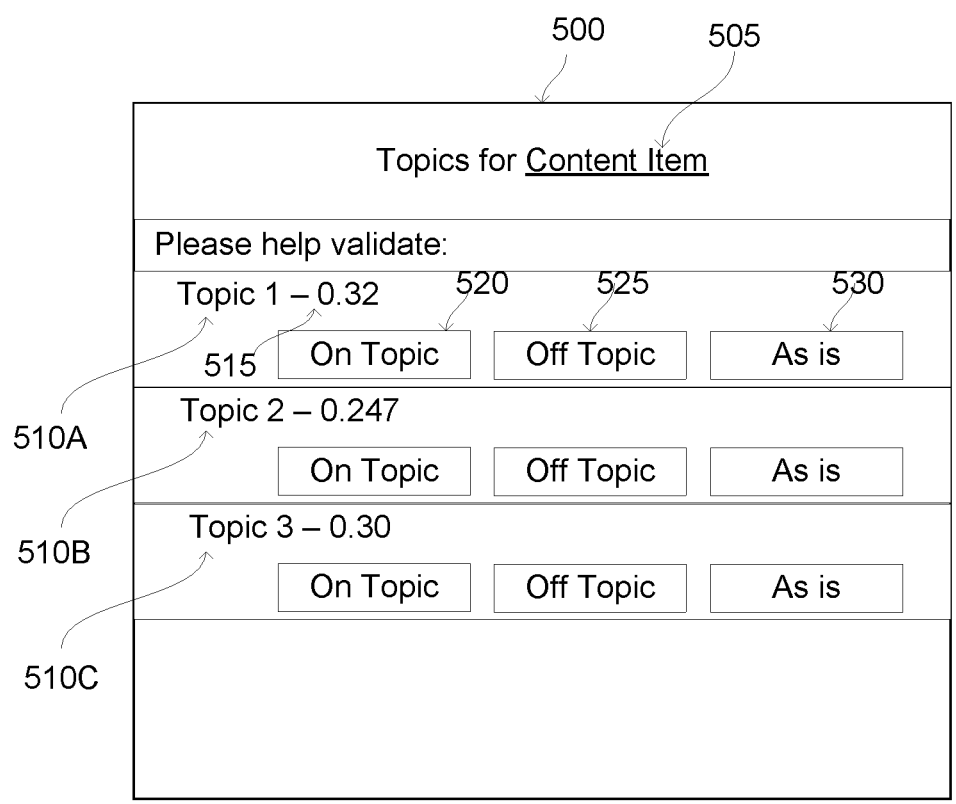
FIG. 5 is an example interface identifying a content item and including options for a user to modify probabilities of one or more topics being associated with the content item, in accordance with an embodiment of the invention.

FIG. 5 shows an example interface 500 identifying a content item and including options for a user to modify probabilities of one or more topics being associated with the content item. The example interface 500 of FIG. 5 presents an identifier 505 of a content item. In various embodiments, the identifier 505 is a link to the content item that, when accessed, retrieves the content item for presentation to a user. In other embodiments, the identifier 505 of the content item also includes a title and a description of the content item along with a link to the content item.

Additionally, the interface 500 identifies topics 510A, 510B, 510C associated with the content item. Determination of topics 510A, 510B, 510C associated with the content item is further described above in conjunction with FIG. 4. While FIG. 5 shows an interface 500 identifying topics 510A, 510B, 510C associated with the content item, the interface 500 may alternatively or additionally identify one or more concepts associated with the content item; determination of concepts associated with the content item is further described above in conjunction with FIG. 4. For each identified topic 510A, 510B, 510C associated with the content item, the interface also identifies a corresponding probability 515 of an identified topic 510A being associated with the content item, determined from the distribution of topics associated with the content item, further described above in conjunction with FIG. 4.

For each identified topic 510A, 510B, 510C, the interface 500 includes an option 520 to increase a probability of an identified topic 510A being associated with the content item and an alternative option 525 to decrease a probability of an identified topic being associated with the content item. As shown in FIG. 5, the option 520 and the alternative option 525 are presented proximate to a corresponding identified topic 510A in the interface 500. When the digital magazine server 140 receives a selection of the option 520 to increase the probability of the identified topic 510A being associated with the content item identified by the interface 500, the digital magazine server 140 increases a probability of the identified topic 510A being associated with the content item, which modifies a distribution of topics associated with the content item. In some embodiments, the digital magazine server 140 increases the probability of the identified topic 510A being associated with the identified content item to a specific value (e.g., 1) in response to receiving the selection of the option 520 to increase the probability of the identified topic 510A being associated with the content item. Conversely, in response to receiving a selection of the alternative option 525 to decrease the probability of the identified topic 510A being associated with the content item identified by the interface 500, the digital magazine server 140 decreases a probability of the identified topic 510A being associated with the content item, which modifies a distribution of topics associated with the content item. In some embodiments, the digital magazine server 140 decreases the probability of the identified topic 510A being associated with the identified content item to a particular value (e.g., 0) in response to receiving the selection of the alternative option 525 to decrease the probability of the identified topic 510A being associated with the identified content item.

In the example of FIG. 5, the interface 500 also includes an additional option 535 presented proximate to corresponding identified topics 510A, 510B, 510C. When the digital magazine server 140 receives a selection of the additional option 535 via the interface, the digital magazine server 535 does not modify the probability of a corresponding identified topic 510A, 510B, 510C being associated with the identified content item. In other embodiments, the interface 500 does not present the additional option 535.

The interface 500 may be presented to users of the digital magazine server 140 via any suitable communication channel. For example, the interface 500 is transmitted to a client device 130 associated with a user of the digital magazine server 140 via a messaging or chat application. As another example, the interface 500 is transmitted to a client device 130 associated with a user of the digital magazine server 140 via an e-mail or text messaging application. In other examples, the interface 500 is a web page or other page of content presented to users via an application associated with the digital magazine server 140 or a browser executing on a client device 130.

By presenting the interface 500 to users of a set, the digital magazine server 140, the digital magazine server 140 obtains higher quality information for generating 450 the model from a smaller set of users, which allows the digital magazine server 140 to refine information from a broader cross-section of users to improve the accuracy of the model. For example, the digital magazine server 140 stores information identifying a set of users who each have a common characteristic, and transmits the interface 500 to client devices 130 associated with one or more users of the set, while not transmitting the interface 500 to client devices 130 associated with users who are not included in the set. As an example, the set includes users who have a specific affiliation with the digital magazine server 140 (e.g., employees of the digital magazine server 140, employees of the digital magazine server 140 who have a specific role with the digital magazine server 140), which limits transmission of the interface 500 to client devices 130 associated with users having the specific affiliation with the digital magazine server 140. Hence, presenting the interface 500 to certain users allows the digital magazine server 140 to refine the generated model based on information from the certain users identifying topics or concepts associated with content items by allowing the digital magazine sever 140 to obtain more accurate identifications of topics or concepts associated with various content items from the certain users.

Referring back to FIG. 4, the digital magazine server 140 subsequently obtains an additional content item and applies the model to the additional content item to determine one or more topics to associate with the additional content item, as well as probabilities of each of the one or more topics being associated with the additional content item. In various embodiments, the digital magazine server 140 applies the generated model to words included in the additional content item, which generates a set of topics associated with the additional content item and probabilities of the topics being associated with the additional content item from the words included in the additional content item, the distribution of concepts associated with content items, and the distribution of topics associated with content items. In various embodiments, the digital magazine server 140 stores topics having at least a threshold probability of being associated with the additional content item in association with the additional content item. Alternatively, the digital magazine server ranks topics identified by application of the model based on their corresponding probabilities and stores topics having at least a threshold position in the ranking.

Figure 6:
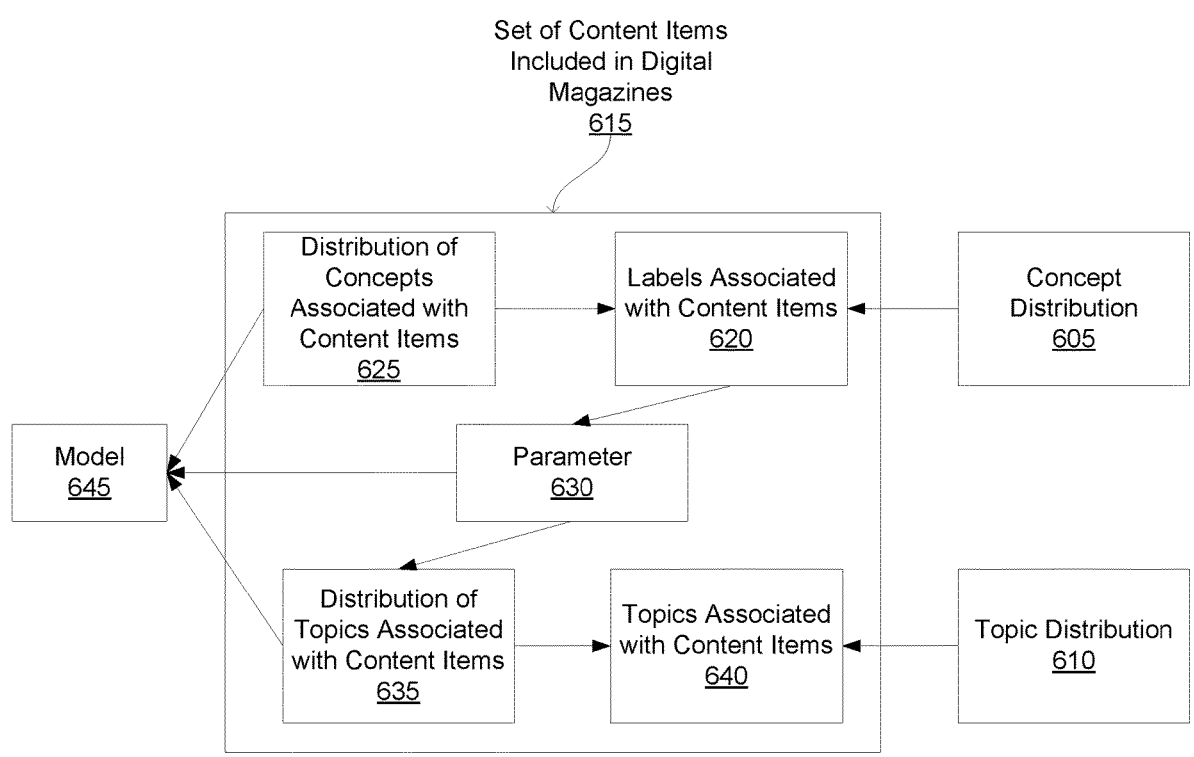
FIG. 6 is a process flow diagram of a method for generating a model determining topics associated with content items obtained by a digital magazine server, in accordance with an embodiment of the invention.

FIG. 6 is a process flow diagram of one embodiment of a method for generating a model for determining topics associated with content items obtained by a digital magazine server 140. As shown in FIG. 6, the digital magazine server 140 determines a concept distribution 605 based on a number of times different concepts are associated with digital magazines maintained by the digital magazine server 140. In various embodiments, the concept distribution 605 is a distribution identifying probabilities of different concepts being associated with content items based on labels determined from characteristics of digital magazines including the content items, as further described above in conjunction with FIG. 4. For example, the concept distribution 605 is a Dirichlet distribution determined from a concept prior and numbers of times different concepts are identified from characteristics of digital magazines. Each concept includes one or more topics. Additionally, the digital magazine server 140 determines a topic distribution 610 based on a number of occurrences of different words or phrases in content items maintained by or accessible by the digital magazine server 140. In various embodiments, the topic distribution 610 is a Dirichlet distribution determined from a topic prior and frequencies with which different words or phrases are identified from content items maintained by or accessible to the digital magazine server 140. The topic prior differs from the concept prior in various embodiments.

The digital magazine server 140 identifies a set 615 of content items that have been included in one or more digital magazines, as further described above in conjunction with FIG. 4. For each content item of the set 615, the digital magazine server 140 determines a distribution 625 of concepts associated with the content item based on the labels 620 associated with the content item and the number of times the labels were associated with the content item. As further described above in conjunction with FIG. 4, labels associated with a content item of the set 615 are based on words or phrases extracted from titles and descriptions of digital magazines including the content item. In various embodiments, the distribution 625 of concepts associated with the content item of the set is a categorical distribution based on a number of labels 620 associated with the content item and numbers of times different labels 620 were associated with the content item. Hence, the distribution of concepts 625 associated with the content item of the set 615 represents probabilities of different concepts being associated with the content item based on the number of times different labels 620 were associated with the content item.

From the distribution 625 of concepts associated with the content item of the set 615, which is based on the labels 620 associated with the content item, the digital magazine server 140 determines 440 a parameter 630 defining a relationship between the distribution 620 of concepts associated with the content item and a distribution 635 of topics associated with the content item. The parameter 630 is based on a number of labels 620 associated with the content item, as further described above in conjunction with FIG. 4. Additionally, for each content item of the set 615, the digital magazine server 140 determines a distribution 635 of topics 640 associated with the content item based on words included in the content item. In various embodiments, the digital magazine server 140 applies a bag-of-words model to the content item of the set 615 to determine frequencies with which different words are included in the content item, while weighting words by the inverse of their frequency within the content item, and determines topics 640 associated with the content item as the words based on the frequencies with which different words are included in the content item. In various embodiments, the distribution 635 of topics associated with the content item of the set 615 is a categorical distribution based on a number of occurrences of different words or phrases in the content item. Hence, the distribution 635 of topics associated with the content item of the set 615 represents probabilities of different topics being associated with the content item based on the frequencies with which different words or phrases occur in the content item.

From the distributions 625 of concepts associated with the content items of the set 615 based on the labels 620 associated with the content items of the set 615, the distributions 635 of topics associated with the content items of the set 615, and the parameters 630 defining relationships between the distributions 625 of concepts associated with the content items of the set 615 and the distributions 635 of topics associated with the content items of the set 615, the digital magazine server 140 generates a model 645 applying topics to content items based on characteristics of content items of the set, as further described above in conjunction with FIG. 4. Application of the model 645 to content items generates topics associated with the content items from words of the content items and also generates probabilities of the generated topics being associated with the content items.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    selecting a set of content items by a digital magazine server, each content item of the set previously included in at least one digital magazine maintained by the digital magazine server;
    for each content item of the set:
        identify characteristics of each digital magazine in which a content item of the set is included;
        determine one or more labels associated with the content item of the set from the characteristics of each digital magazine including the content item of the set;
        store the one or more labels in association with the content item of the set at the digital magazine server;
    obtaining a concept distribution of concepts maintained by the digital magazine server, each concept including one or more topics;
    obtaining a topic distribution of topics maintained by the digital magazine server;
    for each content item of the set:
        determine a distribution of concepts associated with the content item of the set based on the labels associated with the content item of the set;
        determine a parameter defining a relationship between the distribution of concepts associated with the content item of the set and a distribution of topics associated with words included in the content item of the set based on a number of labels associated with the content item of the set;
        determine the distribution of topics associated with the content item of the set based on words included in the content item of the set;
    generating a model applying topics to content items based on characteristics of content items of the set, the distributions of concepts associated with the content items of the set based on the labels associated with the content items of the set, the distributions of topics associated with words included in the content items of the set, and the parameters defining relationships between the concept distributions and the topic distributions associated with the content items of the set, the model generated by:
        selecting a content item of the set;
        transmitting an interface including an identifier of the selected content item of the set, concepts associated with the selected content item of the set and probabilities of each of the concepts being associated with the selected content item of the set from a distribution of concepts associated with the selected content item of the set, and topics associated with the selected content item of the set and probabilities of the topics being associated with words included in the selected content item of the set from the distribution of topics associated with words included in the selected content item of the set to a client device of a user of the digital magazine server, the interface including an option to increase a probability of a concept being associated with the selected content item and an alternative option to decrease the probability of the concept being associated with the selected content item;
        increasing the probability of the concept being associated with the selected content item of the set in response to receiving a selection of the option to increase the probability of the concept being associated with the selected content item of the set from the client device; and
        decreasing the probability of the concept being associated with the selected content item of the set in response to receiving an alternative selection of the alternative option to decrease the probability of the concept being associated with the selected content item of the set from the client device; and
    storing the generated model at the digital magazine server, the generated model determining one or more topics associated with content items based on words included in the content items.

2. The method of claim 1, further comprising:
    obtaining an additional content item at the digital magazine server;
    applying the generated model to the additional content item; and
    storing the one or more topics determined from application of the generated model in association with the additional content item.

3. The method of claim 2, wherein storing the one or more topics determined from application of the generated model in association with the additional content item comprises:

storing topics for which the model determined at least a threshold probability of being associated with the additional content item in association with the additional content item.

4. The method of claim 2, wherein storing the one or more topics determined from application of the generated model in association with the additional content item comprises:
  generating a ranking of topics associated with the additional content item by application of the model based on probabilities of corresponding topics being associated with the additional content item determined by the model;
  selecting one or more topics having at least a threshold position in the ranking; and
  storing the selected one or more topics in association with the additional content item.

5. The method of claim 1, wherein generating the model applying topics to content items based on characteristics of content items of the set, the distributions of concepts associated with the content items of the set based on the labels associated with the content items of the set, the distributions of topics associated with the content items of the set, and the parameters defining relationships between the concept distributions and the topic distributions associated with the content items of the set comprises:
  generating a value based on the parameters defining relationships between the concepts associated with the content items of the set and the distributions of topics associated with the content items of the set;
  generating a distribution of concepts associated with content items from the distributions of the content items of the set based on the labels associated with the content items of the set;
  generating a distribution of topics associated with content items from the distributions of topics associated with words included in the content items of the set; and
  generating the model as a combination of the value, the distribution of concepts associated with content items, and the distribution of topics associated with content items.

6. The method of claim 1, wherein generating the model applying topics to content items based on characteristics of content items of the set, the distributions of concepts associated with the content items of the set based on the labels associated with the content items of the set, the distributions of topics associated with the content items of the set, and the parameters defining relationships between the concept distributions and the topic distributions associated with the content items of the set comprises:
  selecting concepts having at least a threshold probability in the distributions of concepts associated with the content items of the set;
  selecting topics having at least a threshold probability in the distributions of topics associated with the content items of the set; and
  generating the model based on the selected concepts, the selected topics, the distributions of concepts associated with the content items of the set based on the labels associated with the content items of the set, the distributions of topics associated with words included in the content items of the set, and the parameters defining relationships between the concept distributions and the topic distributions associated with the content items of the set.

7. The method of claim 1, wherein characteristics of a digital magazine in which the content item of the set is included comprise a title of the digital magazine and a description of the digital magazine maintained by the digital magazine server.

8. The method of claim 1, wherein the concept distribution of concepts maintained by the digital magazine server comprises a Dirichlet distribution based on a concept prior.

9. The method of claim 8, wherein the topic distribution of concepts maintained by the digital magazine server comprises a Dirichlet distribution based on a topic prior, the topic prior different from the concept prior.

10. The method of claim 1, wherein increasing the probability of the concept being associated with the selected content item of the set in response to receiving the selection of the option to increase the probability of the concept being associated with the selected content item of the set from the client device comprises:
  increasing the probability of the concept being associated with the selected content item of the set to a specific value in response to receiving the selection of the option to increase the probability of the concept being associated with the selected content item of the set from the client device.

11. The method of claim 1, wherein decreasing the probability of the concept being associated with the selected content item of the set in response to receiving the alternative selection of the option to increase the probability of the concept being associated with the selected content item of the set from the client device comprises:
  decreasing the probability of the concept being associated with the selected content item of the set to a particular value in response to receiving the alternative selection of the alternative option to increase the probability of the concept being associated with the selected content item of the set from the client device.

12. The method of claim 1, wherein the interface further comprises including an additional option to increase a probability of a topic being associated with words included in the selected content item and an alternative additional option to decrease the probability of the topic being associated with words included in the selected content item, and the method further comprises:
  increasing the probability of the topic being associated with words included in the selected content item of the set in response to receiving a selection of the additional option to increase the probability of the concept being associated with words included in the selected content item of the set from the client device; and
  decreasing the probability of the topic being associated with the selected content item of the set in response to receiving an alternative selection of the alternative additional option to decrease the probability of the topic being associated with words included in the selected content item of the set from the client device.

13. A computer program product comprising a non-transitory computer-readable storage medium having instructions encoded thereon that, when executed by a processor, cause the processor to:
  select a set of content items by a digital magazine server, each content item of the set previously included in at least one digital magazine maintained by the digital magazine server;
  for each content item of the set:
    identify characteristics of each digital magazine in which a content item of the set is included;

determine one or more labels associated with the content item of the set from the characteristics of each digital magazine including the content item of the set;

store the one or more labels in association with the content item of the set at the digital magazine server;

obtain a concept distribution of concepts maintained by the digital magazine server, each concept including one or more topics;

obtain a topic distribution of topics maintained by the digital magazine server;

for each content item of the set:
  determine a distribution of concepts associated with the content item of the set based on the labels associated with the content item of the set;
  determine a parameter defining a relationship between the distribution of concepts associated with the content item of the set and a distribution of topics associated with words included in the content item of the set based on a number of labels associated with the content item of the set;
  determine the distribution of topics associated with the content item of the set based on words included in the content item of the set;

generate a model applying topics to content items based on characteristics of content items of the set, the distributions of concepts associated with the content items of the set based on the labels associated with the content items of the set, the distributions of topics associated with words included in the content items of the set, and the parameters defining relationships between the concept distributions and the topic distributions associated with the content items of the set, the model generated by:
  selecting a content item of the set;
  transmitting an interface including an identifier of the selected content item of the set, concepts associated with the selected content item of the set and probabilities of each of the concepts being associated with the selected content item of the set from a distribution of concepts associated with the selected content item of the set, and topics associated with the selected content item of the set and probabilities of the topics being associated with words included in the selected content item of the set from the distribution of topics associated with words included in the selected content item of the set to a client device of a user of the digital magazine server, the interface including an option to increase a probability of a concept being associated with the selected content item and an alternative option to decrease the probability of the concept being associated with the selected content item;
  increasing the probability of the concept being associated with the selected content item of the set in response to receiving a selection of the option to increase the probability of the concept being associated with the selected content item of the set from the client device; and
  decreasing the probability of the concept being associated with the selected content item of the set in response to receiving an alternative selection of the alternative option to decrease the probability of the concept being associated with the selected content item of the set from the client device;

store the generated model at the digital magazine server, the generated model determining one or more topics associated with content items based on words included in the content items.

14. The computer program product of claim 13, wherein the non-transitory computer readable storage medium further has instructions encoded thereon that, when executed by the processor, cause the processor to:
  obtain an additional content item at the digital magazine server;
  apply the generated model to the additional content item; and
  store the one or more topics determined from application of the generated model in association with the additional content item.

15. The computer program product of claim 13, wherein store the one or more topics determined from application of the generated model in association with the additional content item comprises:
  storing topics for which the model determined at least a threshold probability of being associated with the additional content item in association with the additional content item.

16. The computer program product of claim 13, wherein store the one or more topics determined from application of the generated model in association with the additional content item comprises:
  generating a ranking of topics associated with the additional content item by application of the model based on probabilities of corresponding topics being associated with the additional content item determined by the model;
  selecting one or more topics having at least a threshold position in the ranking; and
  storing the selected one or more topics in association with the additional content item.

17. The computer program product of claim 13, wherein generate the model applying topics to content items based on characteristics of content items of the set, the distributions of concepts associated with the content items of the set based on the labels associated with the content items of the set, the distributions of topics associated with the content items of the set, and the parameters defining relationships between the concept distributions and the topic distributions associated with the content items of the set comprises:
  generating a value based on the parameters defining relationships between the concepts associated with the content items of the set and the distributions of topics associated with the content items of the set;
  generating a distribution of concepts associated with content items from the distributions of the content items of the set based on the labels associated with the content items of the set;
  generating a distribution of topics associated with content items from the distributions of topics associated with words included in the content items of the set; and
  generating the model as a combination of the value, the distribution of concepts associated with content items, and the distribution of topics associated with content items.

18. The computer program product of claim 13, wherein generate the model applying topics to content items based on characteristics of content items of the set, the distributions of concepts associated with the content items of the set based on the labels associated with the content items of the set, the distributions of topics associated with the content items of the set, and the parameters defining relationships between the concept distributions and the topic distributions associated with the content items of the set comprises:

selecting concepts having at least a threshold probability in the distributions of concepts associated with the content items of the set;

selecting topics having at least a threshold probability in the distributions of topics associated with the content items of the set; and generating the model based on the selected concepts, the selected topics, the distributions of concepts associated with the content items of the set based on the labels associated with the content items of the set, the distributions of topics associated with words included in the content items of the set, and the parameters defining relationships between the concept distributions and the topic distributions associated with the content items of the set.

19. The computer program product of claim 13, wherein characteristics of a digital magazine in which the content item of the set is included comprise a title of the digital magazine and a description of the digital magazine maintained by the digital magazine server.

20. The computer program product of claim 13, wherein the concept distribution of concepts maintained by the digital magazine server comprises a Dirichlet distribution based on a concept prior.

21. The computer program product of claim 20, wherein the topic distribution of concepts maintained by the digital magazine server comprises a Dirichlet distribution based on a topic prior, the topic prior different from the concept prior.

22. The computer program product of claim 13, wherein increasing the probability of the concept being associated with the selected content item of the set in response to receiving the selection of the option to increase the probability of the concept being associated with the selected content item of the set from the client device comprises:

increasing the probability of the concept being associated with the selected content item of the set to a specific value in response to receiving the selection of the option to increase the probability of the concept being associated with the selected content item of the set from the client device.

23. The computer program product of claim 13, wherein decreasing the probability of the concept being associated with the selected content item of the set in response to receiving the alternative selection of the option to increase the probability of the concept being associated with the selected content item of the set from the client device comprises:

decreasing the probability of the concept being associated with the selected content item of the set to a particular value in response to receiving the alternative selection of the alternative option to increase the probability of the concept being associated with the selected content item of the set from the client device.

24. The computer program product of claim 13, wherein the interface further comprises including an additional option to increase a probability of a topic being associated with words included in the selected content item and an alternative additional option to decrease the probability of the topic being associated with words included in the selected content item, and the method further comprises:

increasing the probability of the topic being associated with words included in the selected content item of the set in response to receiving a selection of the additional option to increase the probability of the concept being associated with words included in the selected content item of the set from the client device; and decreasing the probability of the topic being associated with the selected content item of the set in response to receiving an alternative selection of the alternative additional option to decrease the probability of the topic being associated with words included in the selected content item of the set from the client device.

\* \* \* \* \*